United States Patent
Sathish

(10) Patent No.: US 8,635,062 B2
(45) Date of Patent: Jan. 21, 2014

(54) METHOD AND APPARATUS FOR CONTEXT-INDEXED NETWORK RESOURCE SECTIONS

(75) Inventor: Sailesh Kumar Sathish, Tampere (FI)

(73) Assignee: Nokia Corporation, Espoo (FI)

( * ) Notice: Subject to any disclaimer, the term of this patent is extended or adjusted under 35 U.S.C. 154(b) by 372 days.

(21) Appl. No.: 12/760,999

(22) Filed: Apr. 15, 2010

(65) Prior Publication Data

US 2011/0257960 A1    Oct. 20, 2011

(51) Int. Cl.
  *G06F 17/27*  (2006.01)
(52) U.S. Cl.
  USPC .................. 704/9; 704/4; 704/8; 704/10
(58) Field of Classification Search
  None
  See application file for complete search history.

(56) References Cited

U.S. PATENT DOCUMENTS

| | | | |
|---|---|---|---|
| 6,529,902 B1 * | 3/2003 | Kanevsky et al. | 1/1 |
| 2002/0052873 A1 | 5/2002 | Delgado et al. | |
| 2004/0153373 A1 | 8/2004 | Song et al. | |
| 2007/0219985 A1 | 9/2007 | Aravamudan et al. | |
| 2007/0260598 A1 * | 11/2007 | Odom | 707/5 |
| 2008/0209534 A1 | 8/2008 | Keronen et al. | |
| 2010/0005087 A1 * | 1/2010 | Basco et al. | 707/5 |

FOREIGN PATENT DOCUMENTS

EP    1 455 545 A1    9/2004
WO    WO 2008/109485 A1    9/2008

OTHER PUBLICATIONS

International Search Report for corresponding PCT Application No. PCT/FI2011/050260, Aug. 9, 2011, pp. 1-5.
Written Opinion for corresponding PCT Application No. PCT/FI2011/050260, Aug. 9, 2011, pp. 1-8.
Context-Aware Browser, Coppola et al., Intelligent Systems, IEEE, vol. PP, Issue 99, Dec. 1, 2009, pp. 1-23.
How to Use Enriched Browsing Context to Personalize Web Site Access, Bothorel et al., abstract only, Lecture Notes in Computer Science, vol. 2680, 2003, http://www.springerlink.com/content/66056422j5vk81v5/, pp. 1-2.

* cited by examiner

*Primary Examiner* — Leonard Saint Cyr
(74) *Attorney, Agent, or Firm* — Ditthavong Mori & Steiner, P.C.

(57) ABSTRACT

Techniques to provide context-indexed network resource sections include, in response to receiving first data that describes a network resource, determining a section of a plurality of sections included in the network resource. A section context token that indicates a probability in the section of a topic from a context vocabulary is determined. The context vocabulary includes concepts describing temporal, spatial, environmental or activity circumstances of consumers. Second data that indicates the section in association with the section context token is stored.

20 Claims, 12 Drawing Sheets

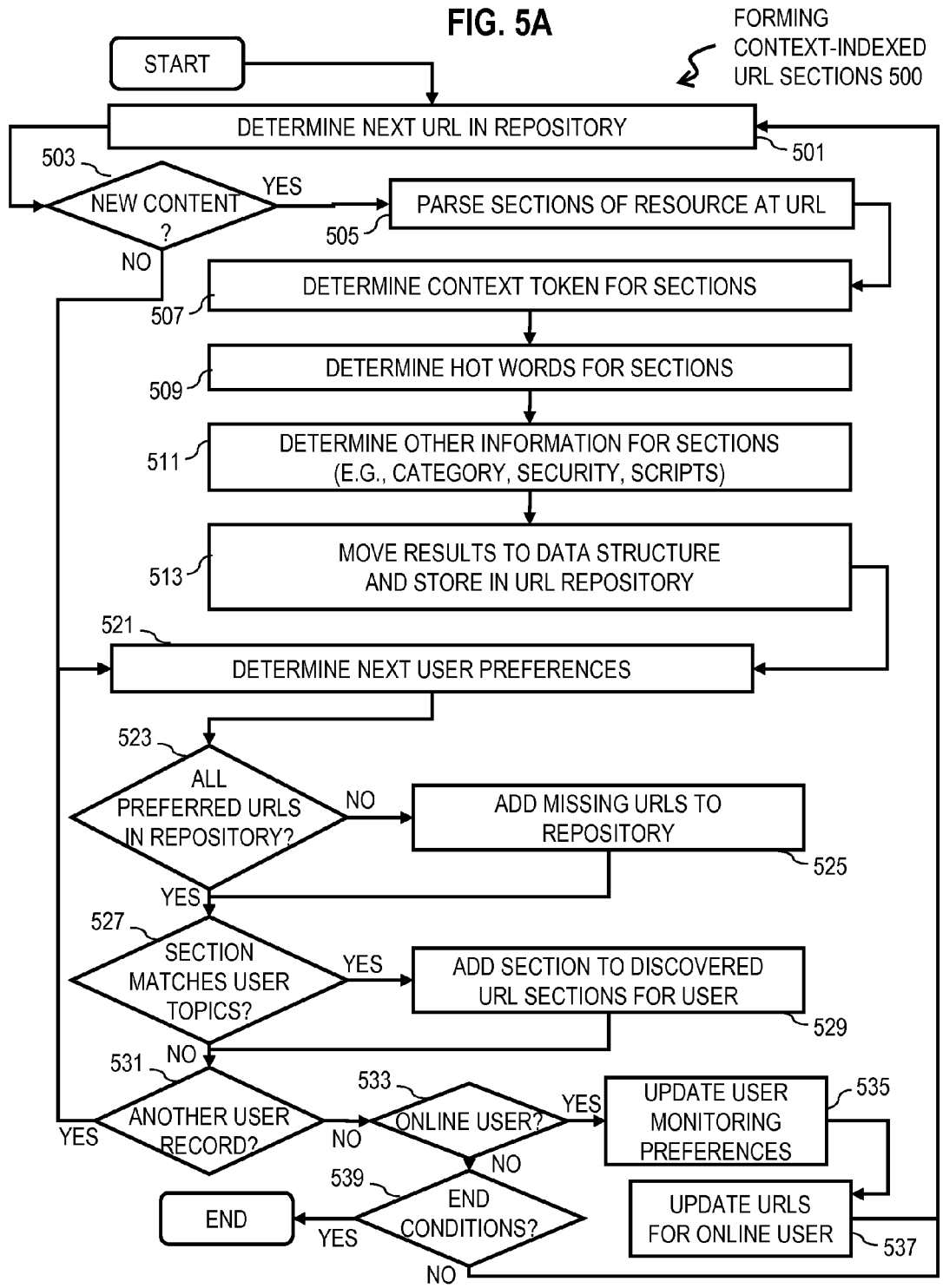

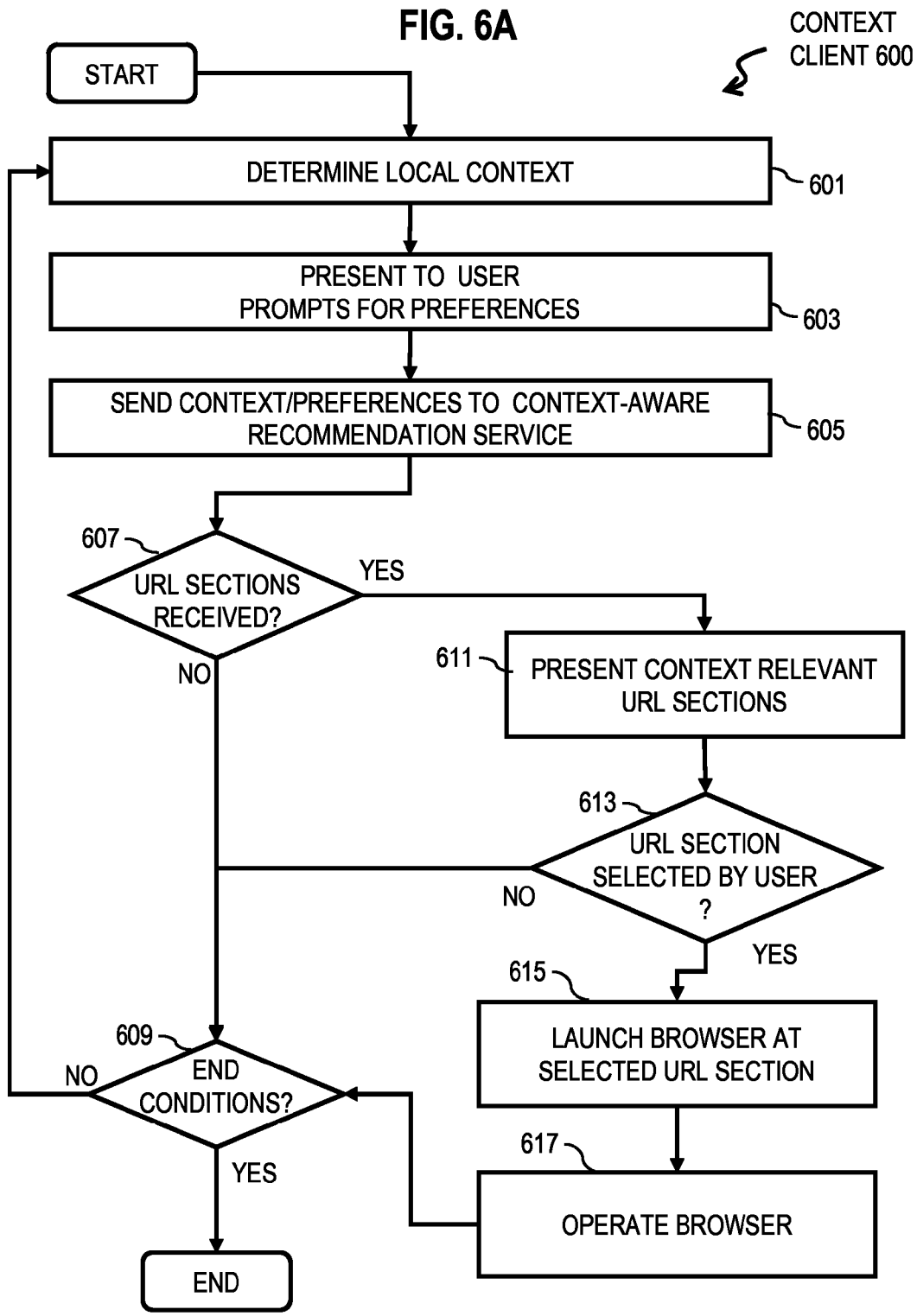

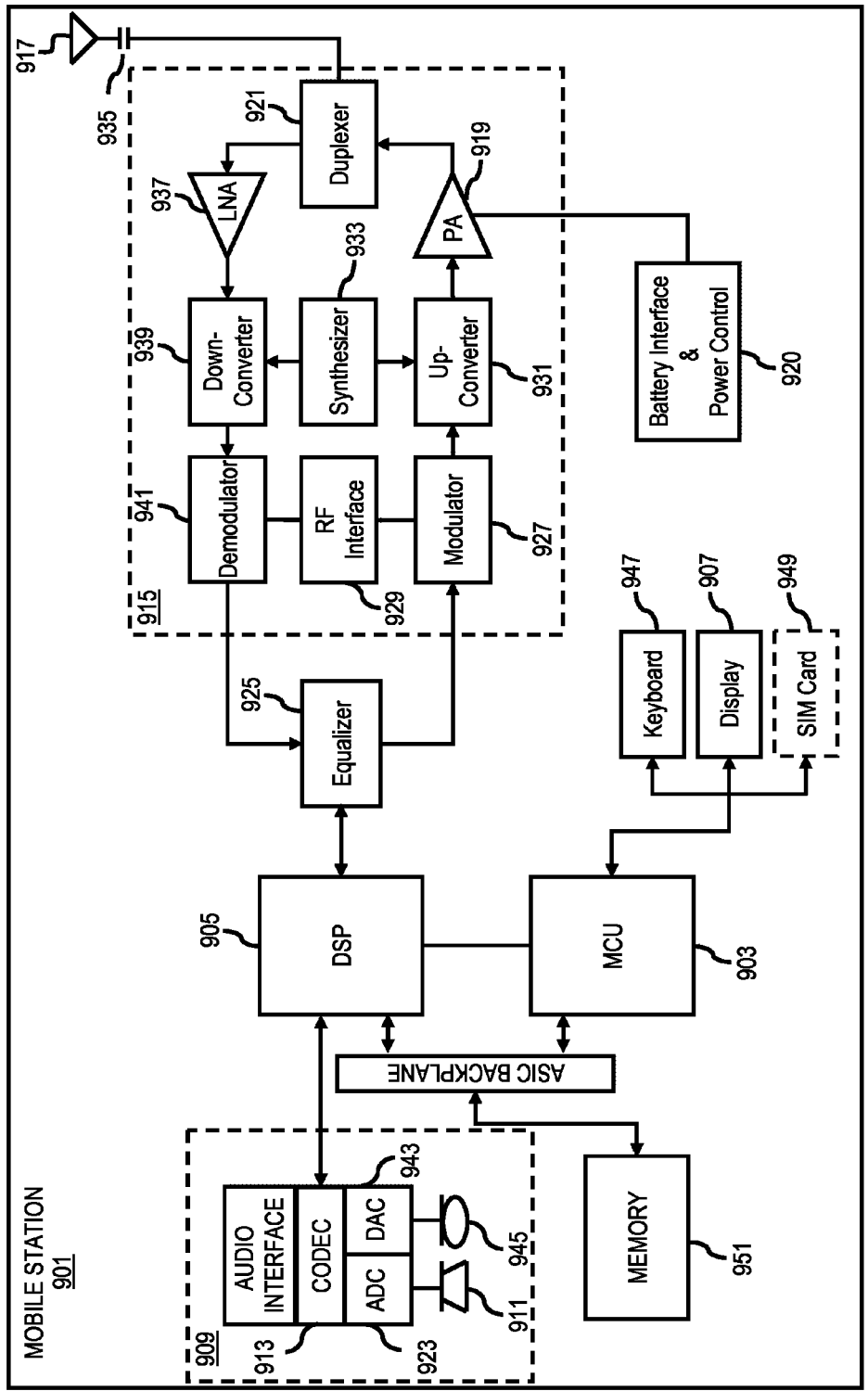

METHOD AND APPARATUS FOR CONTEXT-INDEXED NETWORK RESOURCE SECTIONS

BACKGROUND

Service providers and device manufacturers (e.g., wireless, cellular, etc.) are continually challenged to deliver value and convenience to consumers by, for example, providing compelling network services. One service of interest is to provide consumers with links to recommended relevant network resources, such as home pages of a restaurant or bank or bus depot. However, relevance of network resources can change substantially based on the consumer's circumstances, such as whether the consumer is working for pay or performing other duties or at leisure, whether the current time is a weeknight or weekend, whether the current season is summer or winter, and whether the consumer is at home or away. Furthermore, only a portion of the recommended network resource may be relevant, such as a restaurant review portion of a news service. Thus, a user who selects a link to the network resource, such as the news service, may not be able to ascertain why the network resource was recommended, e.g., from the headlines portion of the news service. New consumers in emerging markets are more likely to be unable to determine the relevance of such recommended links. Much processing and battery power on the consumer's equipment, and much network bandwidth, can be wasted as the new consumer navigates the links trying to find the relevant portion of one or more network resources.

SOME EXAMPLE EMBODIMENTS

Therefore, there is a need for an approach for determining automatically what portions of network resources are relevant based on the current circumstances of a consumer, or user preferences, or both. To support such an automatic determination, a repository of context-indexed network resource sections is provided.

According to one embodiment, a method comprises facilitating access, including granting access rights, to an interface to allow access to a service via a network. The service is configured to, in response to receiving first data that describes a network resource, determine a section of a plurality of sections included in the network resource. The service is further configured to determine a section context token that indicates a probability in the section of a topic from a context vocabulary. The context vocabulary includes concepts describing temporal, spatial, environmental or activity circumstances of consumers. The service is further configured to cause, at least in part, actions that result in storing second data that indicates the section in association with the section context token.

According to another embodiment, a method includes determining local context data that indicates one or more of temporal, spatial, environmental or activity circumstances of a consumer of network services. The method further includes causing, at least in part, actions that result in sending the local context data to a service via a network. The method further includes determining whether data that indicates a section of a plurality of sections in a network resource is received in response to sending the local context data. The method further includes causing, at least in part, actions that result in presenting data that indicates the section to the consumer, if data that indicates the section is received.

According to another embodiment, an apparatus comprises at least one processor, and at least one memory including computer program code. The at least one memory and the computer program code are configured to, with the at least one processor, cause, at least in part, the apparatus to determine a section of a plurality of sections included in a network resource, in response to receiving first data that indicates the network resource. The apparatus is further caused, at least in part, to determine a section context token that indicates a probability in the section of a topic from a context vocabulary. The context vocabulary includes concepts describing temporal, spatial, environmental or activity circumstances of consumers. The apparatus is further caused, at least in part, to perform actions that result in storing second data that indicates the section in association with the section context token.

According to another embodiment, an apparatus comprises at least one processor, and at least one memory including computer program code. The at least one memory and the computer program code are configured to, with the at least one processor, cause, at least in part, the apparatus to determine local context data that indicates one or more of temporal, spatial, environmental or activity circumstances of a consumer who uses the apparatus. The apparatus is further caused, at least in part, to perform actions that result in sending the local context data to a service via a network. The apparatus is further caused, at least in part, to determine whether data that indicates a section of a plurality of sections in a network resource is received in response to sending the local context data. The apparatus is further caused, at least in part, to perform actions that result in presenting data that indicates the section to the consumer, if data that indicates the section is received.

According to another embodiment, a computer-readable storage medium carries one or more sequences of one or more instructions which, when executed by one or more processors, cause, at least in part, an apparatus to determine a section of a plurality of sections included in a network resource, in response to receiving first data that indicates the network resource. The apparatus is further caused, at least in part, to determine a section context token that indicates a probability in the section of a topic from a context vocabulary. The context vocabulary includes concepts describing temporal, spatial, environmental or activity circumstances of consumers. The apparatus is further caused, at least in part, to perform actions that result in storing second data that indicates the section in association with the section context token.

According to another embodiment, a computer program product comprises one or more sequences of one or more instructions which, when executed by one or more processors, cause, at least in part, an apparatus to determine local context data that indicates one or more of temporal, spatial, environmental or activity circumstances of a consumer who uses the apparatus. The apparatus is further caused, at least in part, to perform actions that result in sending the local context data to a service via a network. The apparatus is further caused, at least in part, to determine whether data that indicates a section of a plurality of sections in a network resource is received in response to sending the local context data. The apparatus is further caused, at least in part, to perform actions that result in presenting data that indicates the section to the consumer, if data that indicates the section is received.

According to another embodiment, a computer program product, when executed by one or more processors, cause, at least in part, an apparatus to determine a section of a plurality of sections included in a network resource, in response to receiving first data that indicates the network resource. The apparatus is further caused, at least in part, to determine a section context token that indicates a probability in the section of a topic from a context vocabulary. The context vocabulary includes concepts describing temporal, spatial, environmental or activity circumstances of consumers. The apparatus is further caused, at least in part, to perform actions that result in storing second data that indicates the section in association with the section context token.

According to another embodiment, a computer program product, when executed by one or more processors, cause, at least in part, an apparatus to determine local context data that indicates one or more of temporal, spatial, environmental or activity circumstances of a consumer who uses the apparatus. The apparatus is further caused, at least in part, to perform actions that result in sending the local context data to a service via a network. The apparatus is further caused, at least in part, to determine whether data that indicates a section of a plurality of sections in a network resource is received in response to sending the local context data. The apparatus is further caused, at least in part, to perform actions that result in presenting data that indicates the section to the consumer, if data that indicates the section is received.

According to another embodiment, an apparatus comprises means for determining a section of a plurality of sections included in a network resource, in response to receiving first data that indicates the network resource. The apparatus further comprises means for determining a section context token that indicates a probability in the section of a topic from a context vocabulary. The context vocabulary includes concepts describing temporal, spatial, environmental or activity circumstances of consumers. The apparatus further comprises means for storing second data that indicates the section in association with the section context token.

According to another embodiment, an apparatus comprises means for determining local context data that indicates one or more of temporal, spatial, environmental or activity circumstances of a consumer who uses the apparatus. The apparatus further comprises means for sending the local context data to a service via a network. The apparatus further comprises means for determining whether data that indicates a section of a plurality of sections in a network resource is received in response to sending the local context data. The apparatus further comprises means for presenting data that indicates the section to the consumer, if data that indicates the section is received.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5A is a flowchart of a process at a service for providing and using context-indexed network resource sections, according to one embodiment;

FIG. 6A is a flowchart of a process on consumer equipment for providing context-indexed network resource sections, according to one embodiment;

FIG. 9 is a diagram of a mobile terminal (e.g., handset) that can be used to implement an embodiment of the invention.

DESCRIPTION OF SOME EMBODIMENTS

Figure 1A:
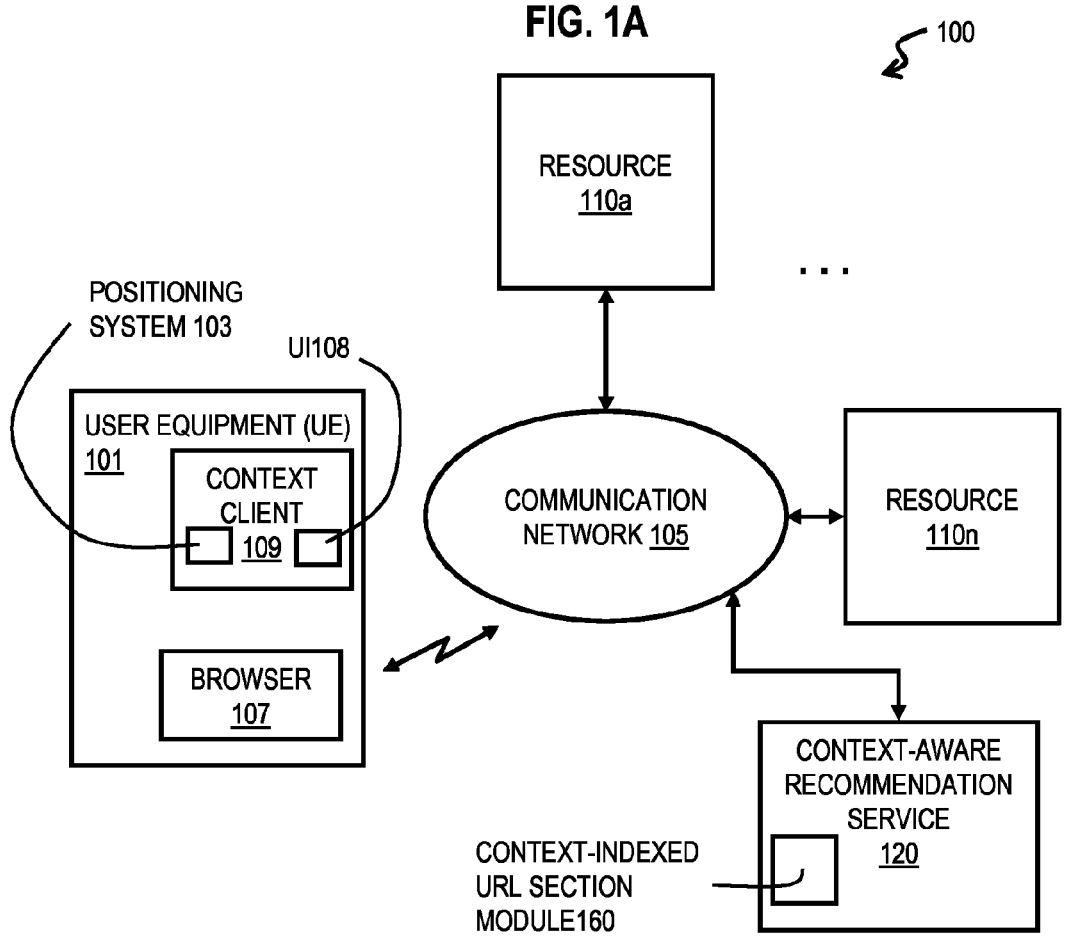
FIG. 1A is a diagram of a system capable of providing context-indexed network resource sections, according to one embodiment.

Examples of a method, apparatus, and computer program are disclosed for providing context-indexed network resource sections. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term context refers to temporal, spatial, environmental or activity circumstances of one or more consumers of network services, or some combination. Example context for a particular consumer of network services includes doing on line bill payments at home on a weeknight while listening to classical music and exchanging texts with three friends. Other example context information includes environment data such as nearby devices, temperature, pressure, humidity, ambient sound, ambient light, velocity, acceleration, or some combination. A network resource is a web page, web service, file or database for which access is granted via a communications network. A network resource is indicated by a network address, such as a uniform resource locator (URL), well known in the art. Some network resources are network services that perform one or more functions, such as social networking or sending and receiving electronic mail, as a result of a message received over a network from a consumer. Although various embodiments are described with respect to a consumer who is a user of a mobile telephone and network resources indicated by URLs, it is contemplated that the approach described herein may be used with other devices, such as desktop or laptop computers, and other indicators of network resources, such as a Internet Protocol (IP) address and Transmission Control Protocol (TCP) port number.

As used herein, context is different from content. As stated above, context refers to circumstances surrounding a consumer. Content refers to what is provided by a network resource; and includes, for example, digital sound, songs, digital images, digital games, digital maps, point of interest information, digital videos, such as music videos, news clips and theatrical videos, advertisements, electronic books, presentations, digital documents, text files, program files or objects, any other digital media, or any combination thereof.

In various embodiments, a context vocabulary and topology is developed that identifies words and topics related to consumers' contexts. Any method known in the art may be used to generate the context vocabulary and topology. For example, several documents are collected that discuss and describe consumer context, such as documents that describe the significance of whether the consumer is working for pay or performing other duties or at leisure, whether the current time is a weeknight or weekend, whether the current season is summer or winter, whether the consumer is at home or away, or whether the consumer is at a destination or en route, whether the consumer is stationary or moving and at what speeds and directions, whether it is light or dark, and what applications are available on a user equipment belonging to the consumer. These documents are mined to determine words related to consumer context, collections of words related to context, or relative usage of those words, or some combination. In some embodiments, the vocabulary topology includes topics imposed on or deduced from relative occurrences of words within the documents. For example, in various embodiments, probabilistic latent semantic indexing (pLSI) or latent Dirichlet allocation (LDA), well known in the art, are used to deduce topics from words in a set of documents. Such methods can be used to derive context words and context topics from a set of documents that are directed to the circumstances of consumers of network services. Because each topic is associated with a group of words in certain relative abundances, there is a topology relating topics to words and subtopics to higher level topics. The context vocabulary topology is used in various embodiments described herein to index network resource sections by context.

FIG. 1 is a diagram of a system 100 capable of providing context-indexed sections of network resources, according to one embodiment. Emerging markets for cell phone manufacturers include first time purchasers among the elderly and third world countries. Such users are not aware of the myriad network resources available through their mobile devices or how to access them. Internet search engines require user input of one or more keywords to determine what network resources are relevant, but do not help the novice user determine what words to enter and do not automatically determine what is relevant based on the consumer's current circumstances. Furthermore, only a portion of an identified network resource may be relevant, such as a restaurant review portion of a news service. Thus, a user who selects a link to the network resource, such as the news service, may not be able to ascertain why the network resource was recommended from the portion of the resource displayed, e.g., from the headlines portion of the news service. New consumers in emerging markets are more likely to be unable to determine the relevance of such recommended links. Much processing and battery power on the consumer's equipment, and much network bandwidth, can be wasted as the new consumer navigates the links trying to find the relevant portion of one or more network resources.

To address this problem, a system 100 of FIG. 1 introduces the capability to provide and use context-indexed URLs for relevant sections of network resource. As shown in FIG. 1, the system 100 comprises user equipment (UE) 101 having connectivity to network resources 110a through 110n (collectively called network resources 110), and context-aware recommendation service 120 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, network resources 110 and context-aware recommendation service 120 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" refer to the processes, rather than the hosts, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web (WWW) servers that provide web pages. For example, UE 101 includes browser 107.

In the illustrated embodiment, the context-aware recommendation service 120 includes a context-indexed URL section module 160 that determines URLs of sections of network resources of potential relevance to consumers who subscribes to the service 120. The potentially relevant URLs are stored in association with topics from a context vocabulary topology. The associated topics are discovered in the sections of network resources associated with those URLs. Thus, not all URLs for resources connected to network 105 need be indexed with topics from the context vocabulary, only those related to network services that the consumers of service 120 use. By connecting the context-aware recommendation service 120 to the network 105, the service 120 facilitates access, including granting access rights, to an interface to allow access to the service 120 and module 160 via the network 105.

The UE 101 includes a browser 107 for communicating with one or more of network resources 110. The UE 101 also includes a context client 109 for communicating with the context-aware recommendation service 120. In some embodiments, the browser 107 performs one or more functions of the context client 109. The context client 109 determines the local context of a consumer who uses UE 101, such as local time, geographic position from positioning system 103, ambient temperature, pressures, sound and light, and applications currently executing on UE 101, content currently being rendered on UE 101, and user input through a user interface (UI) module 108. This information is sent via network 105 to the context-aware recommendation service 120. At the context-aware recommendation service 120, a match is made between the current context of the consumer and the context-indexed URLs maintained by the module 160. One or more URLs relevant to the consumer's current context are sent to the context client 109 as recommendations. The recommended URLs are presented to the consumer, e.g., in browser 107 or UI module 108. When a recommended URL is selected by the consumer at UE 101, the URL is accessed, e.g., by launching the browser 107 to send an HTTP request to the section of the network resource indicated by the URL. As used herein, the URL can include a reference to the web page and to a section within the web page.

The positioning system is any positioning system known in the art, such as the global positioning system (GPS). The UI module 108 includes one or more icons of picture elements to be presented on a display of the UE, or sounds to play through a speaker, and instructions to detect user input, as typed keys or touches on a touch screen or some other operation of an input device on UE 101, such as words spoken into a microphone.

Figure 3:
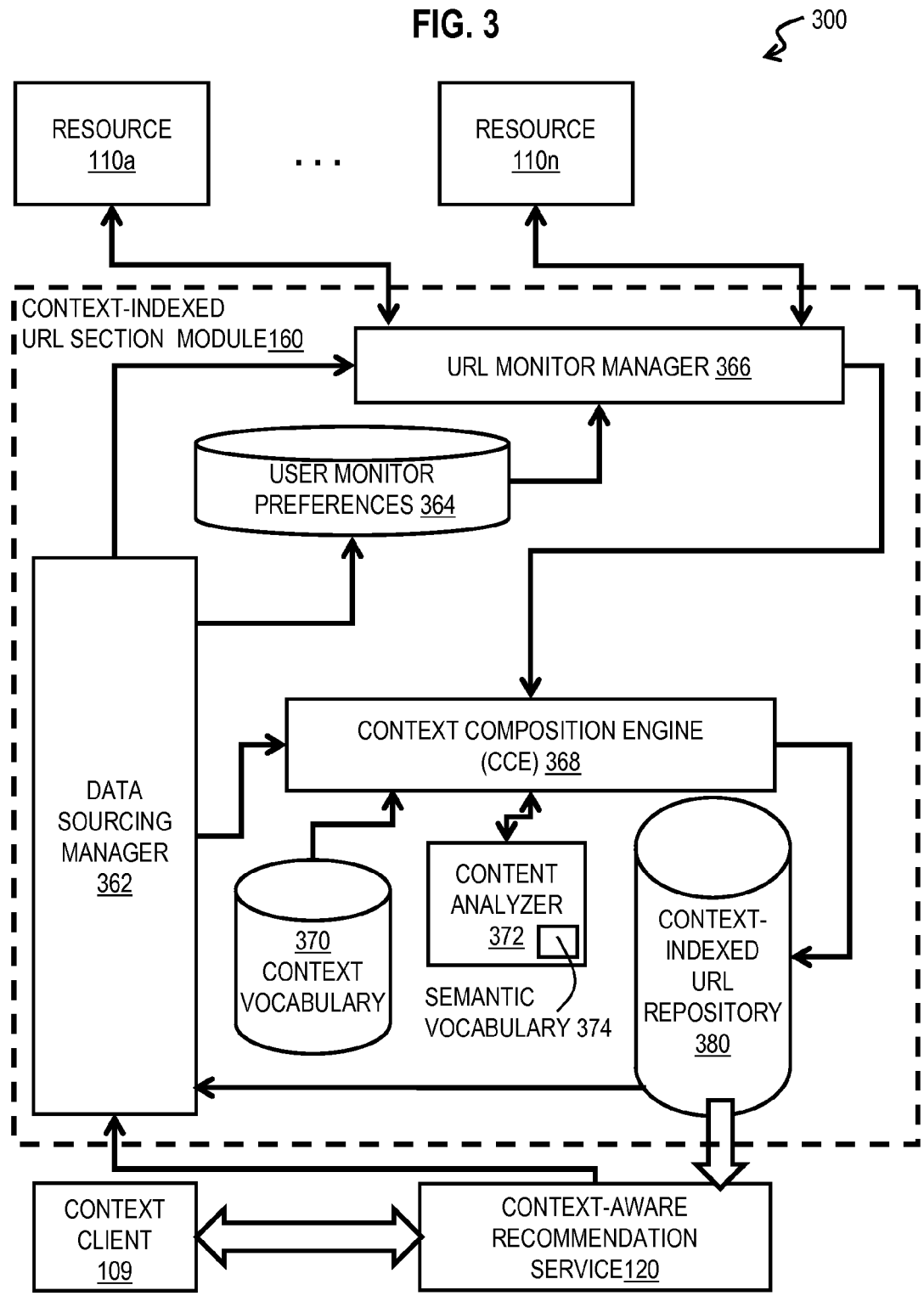
FIG. 3 is a diagram of the components of a context-indexed universal resource locator (URL) section module, according to one embodiment.

Although processes, modules and data structures are shown in FIG. 1, and subsequent diagram FIG. 3, as integral blocks arranged in a particular order on particular equipment for purposes of illustration, in other embodiments one or more processes, modules or data structures, or portions thereof are arranged in a different order on the same or different equipment in communication with network 105. For example, in some embodiments, UI module 108 is external to context client module 109; and in some embodiments is a web page from context-aware recommendation service 120 presented through browser 107.

Figure 1B:
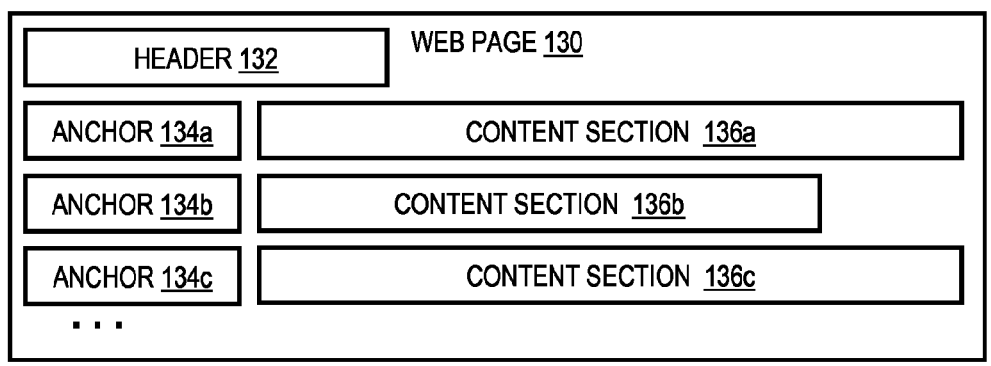
FIG. 1B is a diagram of a network resource with multiple sections of potentially different relevance.

FIG. 1B is a diagram of a network resource, such as web page 130, with multiple sections of potentially different relevance for consumers' particular context. A web page is a data structure sent in one or more messages formatted according to the hypertext transfer protocol (HTTP). Most web pages employ page jumps (or similar mechanisms) that allow users of browsers to jump to specific sections of a web page. Each of these sections is usually marked with a name attribute within an anchor tag and can be linked through an href attribute within the anchor tag with a preceding "#" appended to the name. Thus, the web page data structure includes a header field 132, and one or more content sections. Each section includes an anchor field, such as anchor field 134*a*, anchor field 134*b*, anchor field 134*c* and others indicated by ellipsis (collectively referenced hereinafter as anchor fields 134) that holds data that indicates the anchor name and anchor tag "#.". Each section also includes a content section field, such as content section field 136*a*, content section field 136*b*, content section field 136*c* and others indicated by ellipsis (collectively referenced hereinafter as content section fields 136) that holds data that indicates the contents. Example section contents include text, links to images, links to scripts and links to other web pages. In some cases, the contents of one field, e.g., content section 136*b*, is highly relevant to the current context of a consumer, while the contents of other fields are less relevant or not relevant at all. Presenting the web page header and first content section 136*a*, does not inform the consumer of the relevance of the page. Therefore it is desirable to cause the relevant section of the web page, e.g., content section 136*b*, to be presented automatically to the consumer.

Figure 2:
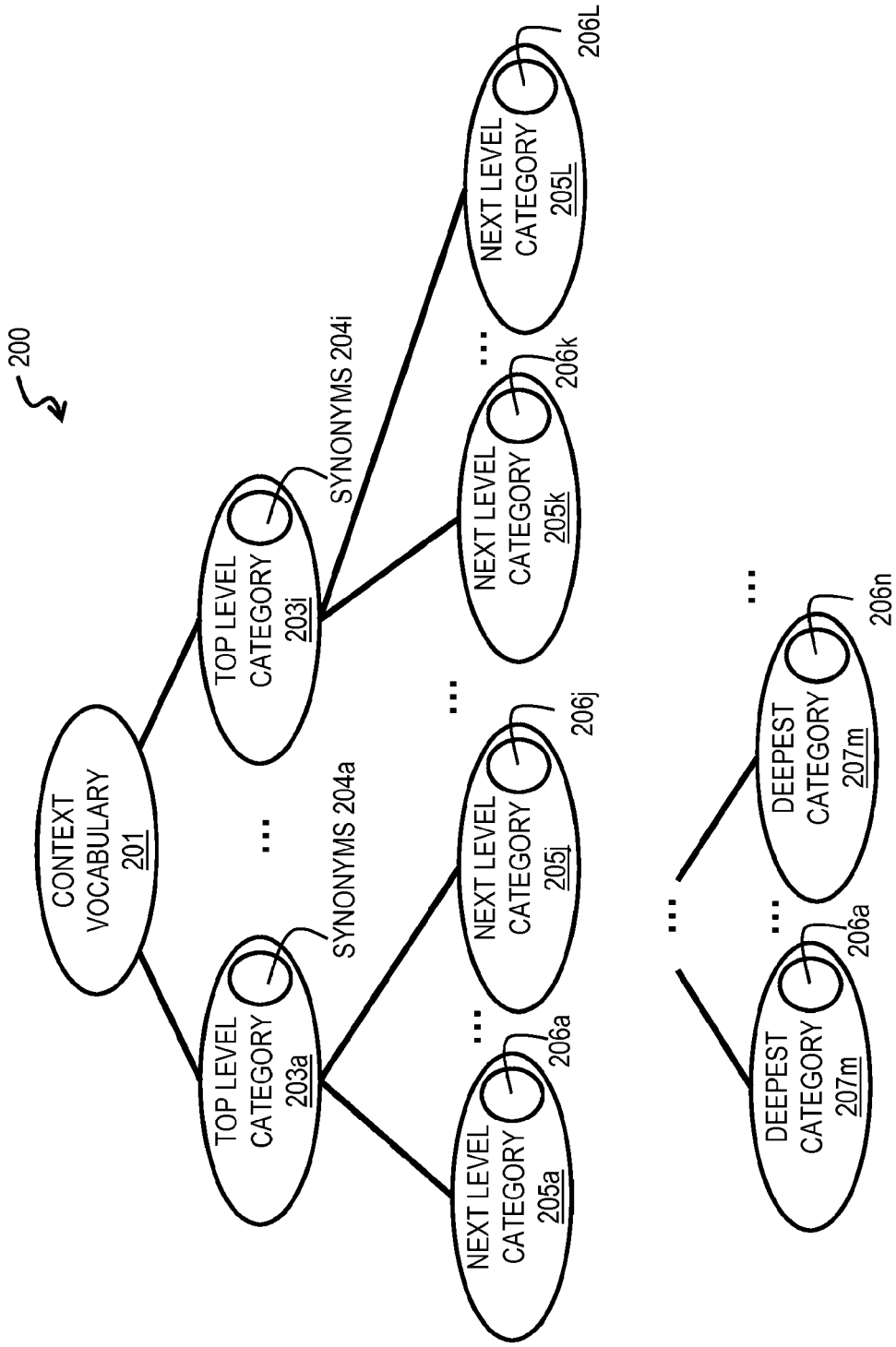
FIG. 2 is a diagram of an example context topic topology, according to one embodiment.

FIG. 2 is a diagram of an example context topic topology, according to one embodiment. This context topic topology is a hierarchical topology that is compared to the topics and words used in one or more network resources, or sections thereof, and current context for a consumer. At the top or root level is the context vocabulary 201 as a whole derived from a set of documents describing consumer context. The context vocabulary is different from other vocabularies, e.g., the vocabularies of biology or literature constructed from different sets of training documents or the vocabulary of the language called the semantic vocabulary. Below the root level are the top level categories 203a to 203i, which are top level of context topics, such as temporal contexts, spatial contexts, activity contexts, each encompassing one or more subtopics. Each topic is represented by a canonical name and zero or more synonyms, including the same name in different languages, such as synonyms 204a in top level category 203a and synonyms 204i in top level category 203i. One or more top level categories may be comprised of one or more next level categories 205a through 205j and 205k through 205L, each with their corresponding synonyms 206a, 206j, 206k and 206L, respectively. For example, temporal context subcategories include time of day, day of week, day of month, month, and season. Intervening levels, if any are indicated by ellipsis. At the deepest level represented by the deepest category 207a to 207m and corresponding synonyms 206a through 206m, respectively, are individual words or phrases such as Monday, o'clock, half past, quarter to, January, summer. Individual words can appear in multiple higher level categories, e.g., Monday appears in week and non-weekend categories.

In some embodiments, e.g., in embodiments based on LDA, there are only two levels of categories, e.g., topics and words, below the root level context vocabulary 201. Each topic is defined by a set of words, each with a particular range of occurrence percentages. In some of these embodiments, a vocabulary of V words is represented by a V-dimensional vector; and each word is represented by a V-dimensional vector with zeros in all positions but the position that corresponds to that particular word. Typically words of low meaning, such as articles, prepositions, pronouns and commonly used words are ignored. Each of T topics is represented by a V-dimensional vector with relative occurrences of each word in the topic represented by a percentage in the corresponding word positions. All topics are represented by a V×T matrix.

When a word from the context vocabulary is found in a document, that word is considered a mixture of the different topics that include that word, with a percent probability assigned to each topic based on the percentage of words in the document, for example using the well known methods of LDA. As a result, the entire document can be represented by a set of topics found in the document with a probability metric assigned to each topic, e.g., a T-dimensional vector with varying probabilities in each position of the vector. Such a vector is called a token herein. Two documents can be compared by computing a similarity of the two T-dimensional vectors (tokens) representing those documents, such as a sum of products of corresponding terms. Alternatively, or in addition, a distance metric can be computed between the two documents, which increases as the two tokens become less similar. Any distance metric can be used, such as an order zero distance (absolute value of the coordinate with the largest difference), an order 1 distance (a sum of the absolute values of the T differences) an order two distance (a sum of the squares of the T differences—equivalent to the Euclidean distance), an order three distance (a sum of cubes of absolute values), etc. The more similar are tokens from two documents, or the smaller the distance between those tokens, the more relevant are the documents to each other. In the following description, it is assumed that a context vocabulary, e.g., as illustrated in FIG. 2, has been defined and is stored in a context vocabulary data structure. The context of a document or resource is represented by a context token. The more similar the context tokens of two documents, e.g., the smaller the distance measure between them, the more relevant one document is to the consumer context indicated by the other document. It is further assumed that there is a different, whole-language, semantic vocabulary for all topics of a language, such as is used in modern search engines.

FIG. 3 is a diagram 300 of the components of a context-indexed URL section module 160, according to one embodiment. By way of example, the context-indexed URL section module 160 includes one or more components for providing links to context-indexed sections of network resources. It is contemplated that the functions of these components may be combined in one or more components or performed by other components of equivalent functionality on the same or different network node. Each component or combination or portion thereof may be implemented in hardware or software or both, e.g. on chip set 800 described n FIG. 8 or a general purpose computer 700 described in FIG. 7.

The context-indexed URL section module 160 interacts with one or more network resources 110 The context-indexed URL section module 160 also interacts with the context client 109 on UE 101, either directly, or indirectly through the context-aware recommendation service 120.

In the illustrated embodiment, the context-indexed URL section module 160 includes a data sourcing manager (DSM) module 362, a user monitor preferences data structure 364, a URL monitor manager module 366, a context composition engine (CCE) module 368, a context vocabulary data structure 370, a context analyzer module 372, and a context-indexed URL repository data structure 380.

The data sourcing manager (DSM) module 362 controls the other depicted modules and acts as central controller for the module 160. The DSM module 362 determines sources of information relevant to consumer context, such as network resources associated with spatial, temporal, environmental or activity information. Each item relevant for consumer context is called a context feature, herein. Two primary sources are utilized: 1] context-indexed URLs in the URL repository data structure 380 and URLs indicated by consumer input. Thus, the DSM module 362 participates in actions that cause, at least in part, first data that describes a network resource to be received.

The DSM module 362 also processes consumer preferences included in messages sent from context client 109 and forwarded by the context-aware recommendation service 120 to the module 362. The consumer preferences for network resources, or portions thereof, if any, are used to populate the user monitor preferences data structure 364.

The user monitor preferences data structure 364 holds data that indicates consumer preferences, if any, for topics, media types, network resources or sections thereof, for each consumer. The consumer is a person who subscribes to the context-aware recommendation service 120, such as any purchaser of equipment from a particular manufacturer of mobile terminals or any subscriber to a network operator. Each consumer has profile information stored that describes the consumer (e.g., consumer ID, service plans, billing information, contacts lists). In addition to the profile (that may be constantly updated), the resource monitoring information is also stored for each consumer. Both the profile and monitoring information along with current context information is used by the recommendation service 120 when making recommendations. The monitor structure is built when the consumer profile is first parsed offline; and a primary matching process is done with existing URLs in the repository data structure 380 to find URLs for resources and sections that align with consumer preferences. In some embodiments, the user monitor preferences data structure 364 also includes a list of URLs that the consumer wishes to visit regularly (e.g., monitored upon login or on some regular schedule). In some embodiments, the consumer provides one or more URLs and also the categories and interest areas in those URLs that the consumer wishes to monitor. As a result, the monitor preferences data structure 364 is built, as described in more detail below with reference to FIG. 4C.

The URL monitor manager 366 visits the network resources indicated in the user monitor preferences data structure and retrieves the content from those resources and passes that content to the context composition engine (CCE) module 368. In some embodiments, the URL monitor manager 366 also visits network resources indicated in the URL repository data structure 380 on a regular or intermittent basis to find updates to those URLs already in the repository.

The context composition engine (CCE) module 368 parses the content of a network resource to determine the sections therein. For each section, the content is parsed to discover a context token that describes the section. A context token indicates a probability of each of one or more topics from the context vocabulary stored in the context vocabulary data structure 370. Furthermore, in some embodiments, the CCE module 368 determines hot words that are outside the context vocabulary, but which still pass multiple filter processes that eliminate words of little information. Some hot words fall within a "rare word" section within a dictionary. For example, the CCE sends descriptions from the user monitor preferences or the section of the resource indicated by the URL, or both, to the content analyzer module 372 to determine the distributions of probabilities in those descriptions of topics from the semantic vocabulary data structure 374. The content analyzer module 372 returns one semantic token to the CCE module 368 for each description.

The CCE module 368 also fills a context feature data structure, as a kind of pre-defined context template, with context feature and URL information including context tokens and semantic tokens for the resource as a whole and for individual sections thereof. If all the fields of the template are filled, the CCE module 368 then passes the filled template (e.g., feature record 470 described below) to context-indexed URL repository data structure 380 for storage and later retrieval by the context-aware recommendation service 120.

The content analyzer module 372 parses the content (e.g., of a fetched web page), extracts the tags and then performs semantic matching to a pre-defined internal vocabulary (e.g., a semantic vocabulary 374 different from context vocabulary 370) and provides a semantic token that identifies the topics and probabilities for the content. Thus, the content analyzer determines semantic tokens for the feature data structure and each section of each URL based on the semantic vocabulary 374, and passes these tokens back to the CCE module 368. By using the content analyzer module 372 to determine the semantic tokens for candidate URLs, the CCE module 368 determines a semantic token that indicates a probability of a topic from a semantic vocabulary in the network resource.

Context data from context client 109 is passed to the DSM module 362, either directly or indirectly through the context-aware recommendation service 120. The DSM module 362 also causes the URL monitor manager to accesses the network resources indicated in the user monitor preferences data structure 364 for the particular consumer and update one or more fields in the URL repository data structure 380. The context-aware recommendation service 120 determines if the current context of a consumer matches any of the contexts of the sections in the context-indexed URL repository data structure. If so, then a URL pointing to a section of a network resource in a matching record is pushed as a recommendation to the context client 109 or browser on the same UE 101. The network data (e.g., URL) identifying the section of the network resource is transmitted, if it is determined that the context for the consumer is close to the context token associated with the section of the network resource (e.g., the URL) and any other preferences are satisfied.

In some embodiments, a URL is pushed only if the context token for the section is less than a threshold distance from the client context. Thus, in some embodiments, determining whether the context for the particular consumer is close to the context token associated with the network resource further comprises determining that the context for the particular consumer is closer than a threshold value to the context tokens associated with the section of the network resource. In some embodiments, only the closest one URL is pushed to the context client. In such embodiments, determining whether the context for the particular consumer is close to the context token associated with the section of the network resource further comprises determining that the context for the particular consumer is closer to the context token associated with the section of the network resource than to a context token associated with any other section or any other network resource.

Figure 4A:
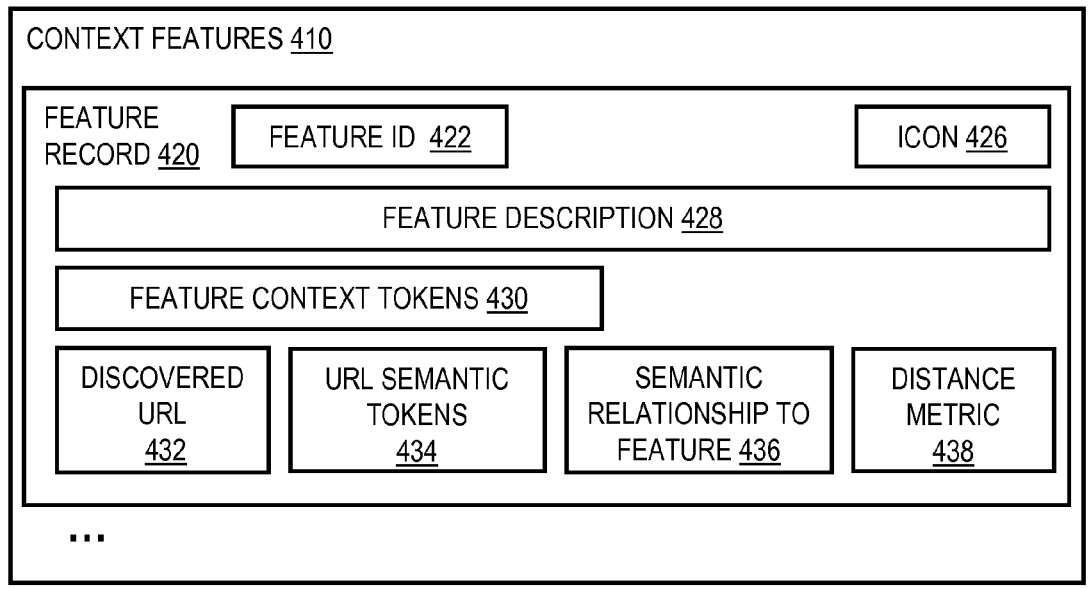
FIG. 4A is a diagram of a context features data structure with context-indexed URL information, according to an embodiment.

FIG. 4A is a diagram of a context features data structure 410 with context-indexed URL information, according to an embodiment. When the context-indexed URL section module 160 determines a context feature, such as geolocation, for a network resource and then associates the context feature with context topics and a URL, the combined information is stored in a context features data structure 460 within the context-indexed URL repository data structure 380.

In the illustrated embodiment, the context features data structure 410 includes a feature record 420 for each context feature retrieved from any network resource 110. Feature records 420 for other features are indicated by ellipsis. The feature record 420 includes a feature identifier (ID) field 422, an icon field 426, a feature description field 428, a feature context tokens field 430, a discovered URL field 432, a URL semantic tokens field 434, a semantic relationship field 436 and a distance metric field 438.

The feature ID field 422 includes data that uniquely indicates the feature among all sources of features. For example, the feature ID field holds data that indicates a network service from which the feature was derived and the unique feature identifier in that service, such as a celebrity fan group in a social networking service for a particular celebrity. In some embodiments in which map points of interest are included in the context features data structure 410, the geolocation information is included in the feature ID field 422.

The icon field 426 holds data that indicates a set of one or more pixels used to present a symbol representing the feature on a display device, such as a pointer to a file that contains an image of the celebrity.

The description field 428 holds data that describes the feature, such as text that indicates a name for the group and text that indicates one or more posts published by the group, one or more associated URLs, if any, and any other information provided by the social networking service in response to a query directed to the group, including any consumer profile information applicable.

The feature context tokens field 430 holds data that indicates context tokens, if any, derived from data in the description field 428 and zero or more of fields 422 and 426. Often, the contents of field 430 are empty until the contents of the description field 428, at least, have been used by the CCE module 368 to derive one or more context tokens from the context vocabulary, e.g., using LDA.

The discovered URL field 432 holds data that indicates a network address of a network resource, such as the URL of that resource. If one URL is included in the description field 428, then, in some embodiments, data indicating that URL is moved to or repeated in field 432. If multiple URLs are included in the description field 428, then data indicating one of those URLs is moved to or repeated in field 432. In some embodiments, the URL in field 432 is determined by other means, e.g., by use of a search engine.

The URL semantic tokens field 434 holds data that indicates one or more semantic tokens derived from the resource indicated by the URL indicated in field 432, as determined by the content analyzer module 372.

The semantic relationship to feature field 436 holds data that indicates the type of agreement between the semantic tokens derived for the description in field 428 and the semantic tokens in field 434, e.g., substantively exact, nearby, or distant.

The distance metric field 438 holds data that indicates a distance between the feature and URL semantic tokens. Again any measure of distance may be used, as described above. In some embodiments, field 436 is used instead of fields 434 and 438.

Feature record 420 is an example means to provide the advantage of associating a URL with context features that can be related to a consumer's current context, such as the consumer's current time or activity. For example, if the user's current activity includes viewing posts to a social networking group of fans of a particular celebrity, record 420 associates that social networking group with a URL of the celebrity's website.

Figure 4B:
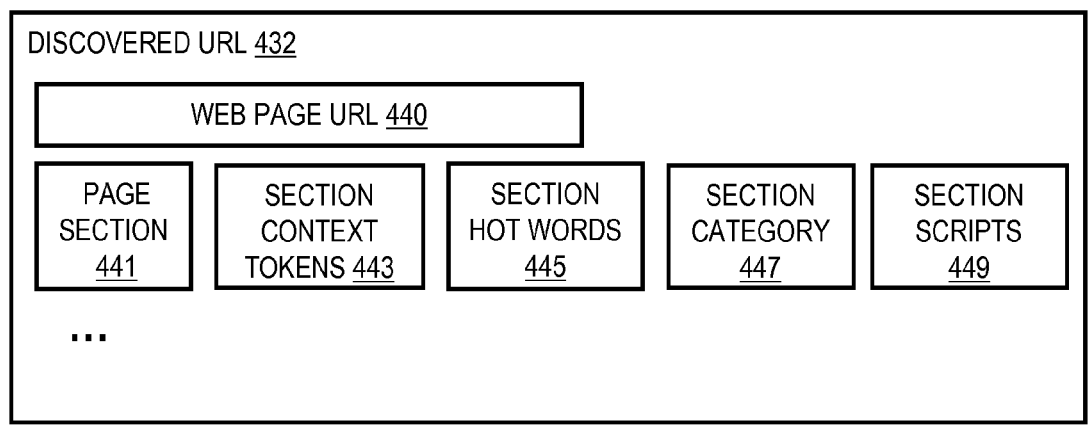
FIG. 4B is a diagram of a network resource field that relates context to a section of the network resource, according to an embodiment.
Figure 4C:
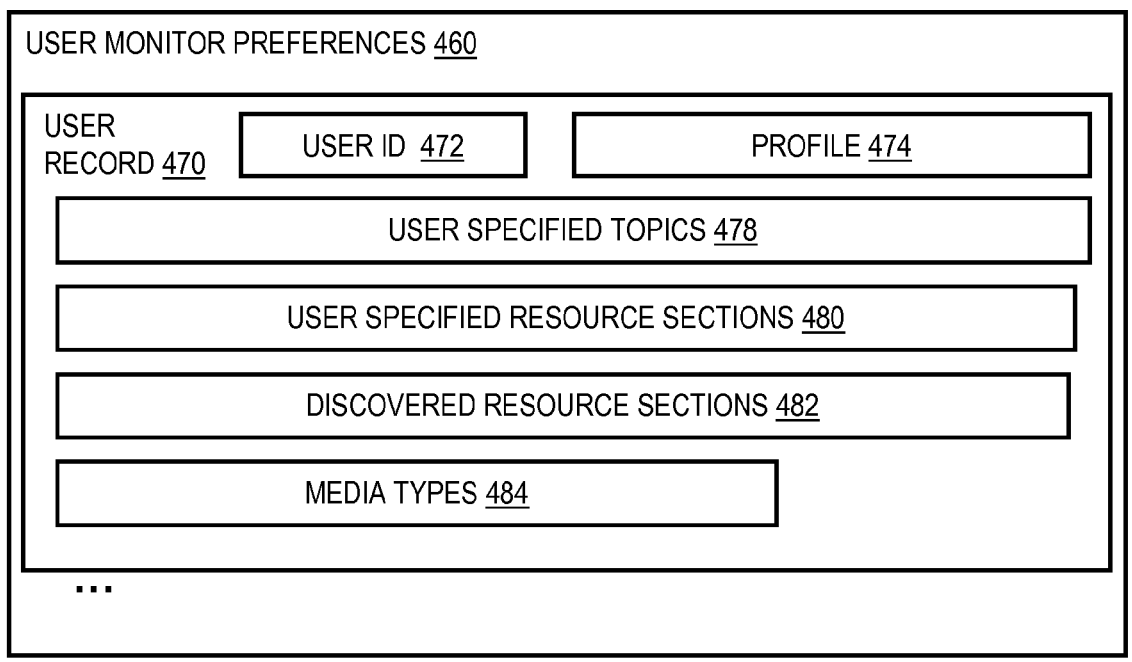
FIG. 4C is a diagram of a monitor preferences data structure with context-indexed URL information, according to an embodiment.

Although fields are shown in FIG. 4A and subsequent data structure figures, FIG. 4B and FIG. 4C as integral portions of memory or storage in a particular order in a single data structure for purposes of illustration, in other embodiments, one or more fields or portions thereof are arranged in a different order on the same or different one or more data structures on one or more nodes in communication with network 105, or one or more fields or portions thereof are omitted, or additional fields are added, or the data structure is changed in some combination of ways.

FIG. 4B is a diagram of a network resource field 432 that relates context to a section of the network resource, according to an embodiment. In this embodiment, the discovered URL field 432 includes a web page URL field 440, and one or more sections-related fields. The web page URL field 440 holds data that indicates the network address of the network resource, such as the URL of a web page that has been identified as relevant to consumer context.

The section-related fields include, for each section of the web page, a page section field 441, a section context tokens field 443, a section hot words field 445, a section category field 447 and a section scripts field 449. Section-related fields for other sections of the web page are indicated by ellipsis. The page section field 441 holds data that indicates a section of the network resource indicated by the URL in field 440. For example, in some embodiments, the page section field 441 holds data that indicates a "#" followed by an anchor name. The anchor name matches a name indicated in at least one anchor field 134 of a web page 130. In some embodiments, the combination of field 440 and field 441 indicates a path in the web site map that can be used to construct the link to the particular section, The section context tokens field 443 holds data that indicates one or more context tokens that each indicates topics from the context vocabulary and corresponding probabilities that apply to the web page section indicated in field 441. Fields 441 and 43 in association is an example means to provide the advantage of associating a URL to a section of a network resource with context features that can be related to a consumer's current context, such as the consumer's current time or activity. For example, if the user's current activity includes viewing posts to a social networking group of fans of a particular celebrity, field 443 associates that social networking group with a celebrity section of a news website, which carries a story about that celebrity. This saves processing steps and battery life on the consumer's UE 101, because no further navigating is needed to find the contextually most relevant section of a web page The section hot words field 445 holds data that indicates one or more hot words that are not common, are not of little unique meaning, and are not in the context vocabulary, but do appear in the page section indicated in field 441. The hot words field 445 is an example means to achieve the advantage of matching not only the consumers' current context but the consumer non-context interests to the semantic content of a section of a network resource (in field 441). This saves processing steps and battery life on the consumer's UE 101, because no further navigating is needed to find the most interesting section of a web page.

The section category field 447 holds data that indicates a category for the page section indicated in field 441. Any category may be used, such as sports, entertainment, or food. In some embodiments, the category is determined to be the most probable topic in the context tokens in field 443 or in a semantic token for the section. In some embodiments, field 447 is omitted. The category field 447 is an example means to achieve the advantage of matching not only the consumers' current context but the consumer non-context interests to the semantic content of a section of a network resource (in field 441). This saves processing steps and battery life on the consumer's UE 101, because no further navigating is needed to find the section of a web page in the correct category.

The section scripts field 449 holds data that indicates a method to apply when the page section in field 441 is presented to a consumer, such as a sound to play or launching the browser or forms to present to the consumer independent of what would be presented by that section of the web page. In some embodiments, field 449 is omitted. In some embodiments, one or more additional section-related fields are added, such as fields holding data that indicates security information, billing information, or other information associated with the page section. The scripts field 449 is an example means to achieve the advantage of alerting a consumer or otherwise acting on the occurrence of a relevant section of a network resource. This saves processing steps and battery life on the consumer's UE 101, because no further actions are needed to recognize when a relevant section of s network resource is found.

FIG. 4C is a diagram of a monitor preferences data structure 460 with context-indexed URL information, according to an embodiment. The user monitor preferences data structure 460 holds information that informs the context-aware recommendation service 120 of URLs of network resources and sections of interest to a particular consumer, so that these URLs are checked periodically while that particular consumer is in communication with the service. While other network resources within the repository data structure 380 are also updated on occasion, either regularly or sporadically, the URLs in user monitor preferences 460 are visited preferably at least once while a consumer is in persistent communication with the service. The user monitor preferences data structure includes a user record 470 for every consumer who is registered with the context-aware recommendation service 120. Additional user records for additional consumers are indicated by ellipsis. The user record is an example means to achieve the advantage of updating the tokens of network resources of special relevance to an individual consumer, without updating every resource recorded in the URL repository data structure 380. This save processing power, memory, and delay times on the service providers' equipment and save bandwidth on the communications network 105.

Each user record 470 includes a user identifier (ID) field 472, a profile field 474, a user specified topics field 478, a user specified resource sections field 480, a discovered resource sections field 482 and a media types field 484.

The user ID field holds data that uniquely identifies the consumer, e.g., with a cell phone number, or email address or user name. The profile field 474 holds data that indicates the profile of the user such as the user's address, full name, friends, contacts, services, etc., or a pointer to one or more user profile data structures where such information is held.

The user specified topics field 478 holds data that indicates one or more context tokens or semantic tokens or hot words that are interest to the consumer indicated in field 472, including one or more words or phrases from the user profile section 474. For example, the field 478 includes a set of tokens for which a match is given high weight when determining which resource sections to present to the consumer. This field is an example means to achieve the advantage of selecting a "best" resource section so that a user is not presented with too many recommendations. Sending only a best recommendation saves bandwidth on communications network 105 and processing time and battery life on the consumer's user equipment.

The user specified resource sections field 480 holds data that indicates URLs that indicate one or more resources or resource sections in which the user is interested and which should be monitored for context-relevant content. This field is an example means to achieve the advantage of focusing on updating content tokens for only a few network resources. This saves bandwidth on communications network 105 and processing time and memory on the service provider's equipment.

The discovered resource sections field 482 holds data that indicates sections of other resources, e.g., resources indicated in the URL repository data structure 380, which were found to match well (e.g., have high similarity or small distance metric) compared to the topics in the user specified topics field 478. These resource sections are discovered from the backend and have tokens that show high levels of matching that are recommended to the consumer. This field is an example means to achieve the advantage of focusing on updating content tokens for only a few network resources but learning better URLs than the ones the user suggested with limited knowledge. This saves bandwidth on communications network 105 and processing time and memory on the service provider's equipment to find the "best" resource section recommendations.

The media types field 484 holds data that indicates one or more media types that are preferred by the particular consumer. Data in this field indicate consumer preference for any particular media types such as text or video. This field is an example means to achieve the advantage of avoiding recommendations of network resources that do not provide the desired media types. This saves bandwidth on communications network 105 and processing time and memory on the service provider's equipment sending inadequate recommendations.

Figure 5B:
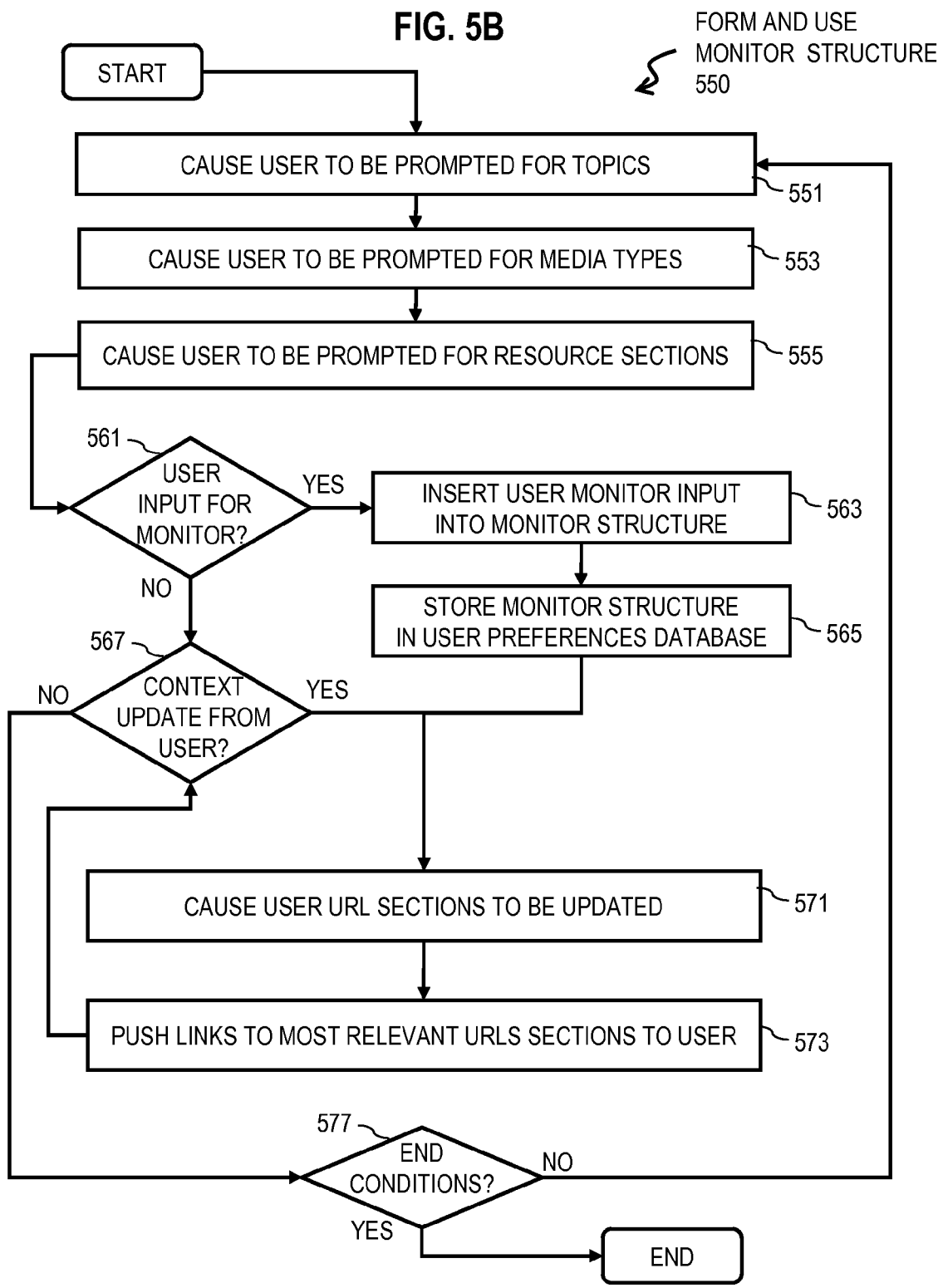
FIG. 5B is a flowchart of a process at a service for providing and using monitor preferences, according to one embodiment.

FIG. 5A is a flowchart of a process 500 at a service for providing and using context-indexed network resource sections, according to one embodiment. Although processes are depicted in FIG. 5, and subsequent flowcharts FIG. 5B and FIG. 6, as integral steps in a particular order for purposes of illustration, in other embodiments one or more steps, or portions thereof, are performed in a different order or overlapping in time, in series or parallel, or one or more steps or portions thereof are omitted, or other steps are added, or the process is changed in some combination of ways. In one embodiment, the context-indexed URL section module 160 performs the process 500 and is implemented in, for instance, a chip set including a processor and a memory as shown FIG. 8 or a general purpose computer as depicted in FIG. 7.

Step 501 through 513 are performed to fill one or more of section-related fields 441, 443, 445, 447 or 449 in discovered URL fields 432 of feature records in the context-indexed URL repository data structure 380. In step 501, the next URL in the URL repository data structure 380 is determined. For example, a URL is retrieved from field 440 of field 432 of a next feature record 420 in a sweep of the URL repository data structure 380 by the DSM module 362. Thus first data that describes a network resource is received. In step 503, it is determined if the network resource indicated by the URL has new content, i.e., content different from the content described in the section-related fields 441 through 449. The URL has new content if one or more of the fields 441 through 449 is empty or older than a most recent update of the network resource indicated by the URL. For example, if the fields are empty, then per se the network resource has new content. If not empty, then the network resource is assumed to have new content if a most recent update of the URL is after a timestamp associated with the fields 441 or 443. In some embodiments, the DSM module 362 directs the URL monitor manager module 366 to visit the network resource 110 to determine the latest revision date of the network resource. In some embodiments, the revision date of the network resource is not used; and the DSM determines that the data is out of date after a particular time, e.g., after a week, without directing the URL monitor manager module 366 to access the network resource.

If the network resource has new content, then control passes to step 505 to parse the resource indicated in the URL field 440 to determine one or more sections therein. For example, the text of a web page is parsed to find the "#" followed by an anchor name that separates one section of a web page from another. All sections of the network resource are determined in step 505. Data indicating the path to each section is inserted into the page section field 441 of the corresponding section. In some embodiments, the URL monitor manager module 366 performs step 505. In some embodiments, data from the network resource is passed to the CCE module 368 that performs step 505. Thus, a section of a plurality of sections included in the network resource is determined in response to receiving first data that describes a network resource.

In step 507 the context tokens for the sections are determined. For example, the CCE module 368 compares one or more portions of text from the section to the context vocabulary in data structure 370 using LDA to generate a context token for each portion of the data in the section. Data indicating the context tokens is inserted into field 443. Thus, a section context token that indicates a probability in the section of a topic from a context vocabulary is determined in response to receiving first data that describes a network resource. This step is an example means of determining the context for a section of network resource, a higher granularity than offered by previous approaches. This offers the advantage of presenting the most relevant section of network resource to a user, without extraneous operations or consumption of battery power.

In step 509 the hot words outside the context vocabulary are determined for the sections. For example, the CCE module 368 sends the one or more portions of text from the section to the content analyzer module 372 to determine semantic tokens for topics in the semantic vocabulary 374 using LDA to generate a context token for each portion of the data in the section and to determine any rare words. The CCE module 368 then strips off words or topics also found in the context vocabulary, so the remaining hot words are for terms outside the context vocabulary. Data indicating the hot words, if any, is inserted into field 445. Thus, the module 160 is further configured to determine an unusual word different from the context vocabulary in the section; and the user record 470 further indicates the unusual word. This step is an example means to achieve the advantage of presenting a best match among several that are contextually relevant and save processing power and battery life on the consumer's equipment that would otherwise be spent navigating from an non-optimal recommendation.

In step 511, other information associated with the sections is determined, such as a category and one or more scripts. As mentioned above, in some embodiments a category is determined from a most probable topic in the context tokens or semantic tokens, and data indicating the category is inserted into field 447. In some embodiments, category is determined based on a keyword in the header field 132 of a web page resource. Thus, the module 160 is further configured to determine at least one of a category or a script for the section; and the user record 470 further indicates the unusual word. This step is an example means to achieve the advantage of presenting a best match among several that are contextually relevant and save processing power and battery life on the consumer's equipment that would otherwise be spent navigating from an non-optimal recommendation.

In step 513, the results of steps 505 through 511 in fields 441 through 449 for all the sections are stored in the URL repository data structure 380. Thus, the module 160 causes, at least in part, actions that result in storing second data that indicates the section in association with the section context token. This step is an example means to achieve the advantage of associating context and content relevance with sections of a network resource. Control then passes to step 521 and following to determine whether the network resource just added meets any user monitor preferences.

If it is determined in step 503 that there is no new content in the next URL of the repository, or after step 513, control passes to step 521. In step 521 the user preferences for the next user is determined, starting with the first user record in user monitor preferences data structure 460.

In step 523, it is determined whether all the user specified network resources are represented by URLs in the URL repository. If not, then the missing URLs are added to the URL repository in step 525. In some embodiments, step 525 comprises adding the URLs to the next URL to be determined in step 501. In some embodiments, step 525 comprises immediately accessing and parsing the network resources indicated by those URLs, e.g., by passing control to step 505 and following. This step is an example means to achieve the advantage of adding relevant URLS to the URL repository data structure 380.

After step 525, or if it is determined in step 523 that all user preferences for network resources are already represented by URLs in the URL repository data structure 380, control passes to step 527. In step 527, it is determined whether the tokens or hot words of the sections of the current network resource match the topics and hot words in the user specified topics field 478. In some embodiments the H hot words are added as new elements in a T+H dimensional vector, with each of the H elements corresponding to the hot words having a high probability in the user specified topics. In some embodiments, the resource section matches the user specified topics in field 478 if a similarity measure is above some threshold. In some embodiments, the resource section matches the user specified topics in field 478 if a distance metric is less than some threshold. If the section matches the user specified topics, then, in step 529, the URL for the section is added to the section URLs in the discovered resource section field 482. For example, if the user specified topics include soccer Team A and media type of video, and a European sports web site has a video clip about Team A in the soccer section of their web page, then the soccer portion of the European sports web site is a close match and is added to the discovered resource sections field 482. This step is an example means to provide the advantage of learning relevant resource sections that were not known by the user.

In step 531, it is determined if there is another user record in the user monitor preferences data structure 460, which has not yet been compared to the current URL from the URL repository. If so, control passes back to step 521 to compare the sections of the network resource at the current URL to the data in the fields of the next user record 470. If all the user records 470 have been checked against the sections of the current URL, then control passes to step 533.

In step 533, it is determined if there is a user currently online. If not, then control passes to step 539 to determine whether conditions for ending the process are satisfied. If so, the process ends. Otherwise control passes back to step 501 to consider the next URL, either in the URL repository already or to be added as determined in step 525.

If it is determined, in step 533, that there is a user currently online, then in step 535 user monitoring preferences are updated. For example, prompts are caused to be presented to the consumer for input to fill or change the contents of user specified topics field 478, or user specified resources field 480 or user specified media types field 484, as described in more detail below with reference to FIG. 5B, FIG. 6A and FIG. 6B.

In step 537 the URLs are visited and updated for the online user. For example, the network resources for the URLs listed in field 478 or field 482 are accessed; and the URL repository entries (e.g., fields 441, 443, 445, 447 or 449) for any changed sections are updated, as described in more detail below with reference to FIG. 5B. Then matching is done, e.g., by the context-aware recommendation service 120) with the updated context and semantic tokens to determine which resource sections should have their URLs pushed to the user equipment. Control then passes back to step 501 to determine the next URL, either in the URL repository already or to be added as determined in step 525. This step provides the advantage of updating the most likely to be relevant network resources, thus reducing bandwidth consumption on network 105 and processing expenditures on service provider equipment.

FIG. 5B is a flowchart of a process 550 at a service for providing and using monitor preferences, according to one embodiment. In one embodiment, one or more components of the context-indexed URL section module 160 performs the process 500 and is implemented in, for instance, a chip set including a processor and a memory as shown FIG. 8 or a general purpose computer as depicted in FIG. 7.

In step 551, actions are performed that cause the consumer to be prompted for preferred topics. For example, a web form is passed to the browser 107 or context client 109 on UE 101 in one or more messages, such as one or more HTTP messages. The browser 107 or context client 109 then presents the form to the consumer using a display on UE 101, as described in more detail below with reference to FIG. 6B. The topics are provided by the consumer as text describing items of interest in one or more circumstances for the user, or provided as names of documents or files or network resources, or portions thereof, that include such text.

In step 553, actions are performed that cause the consumer to be prompted for preferred media types. For example, an icon representing a virtual button is passed to the browser 107 or context client 109 on UE 101 in one or more messages, such as one or more HTTP messages. The browser 107 or context client 109 then presents the button to the consumer using a display on UE 101, as described in more detail below with reference to FIG. 6B. The media types are provided by the consumer by activating buttons associated with the media type. In some embodiments, media types are presented and the consumer is prompted to rank the media types in order of decreasing preference.

In step 555, actions are performed that cause the consumer to be prompted for resource sections, e.g. one or more URLs with anchor names. For example, a web form is passed to the browser 107 or context client 109 on UE 101 in one or more messages, such as one or more HTTP messages. The browser 107 or context client 109 then presents the form to the consumer using a display on UE 101, as described in more detail below with reference to FIG. 6B. The resource sections are provided by the consumer as paths to the section of interest, such as URLs with anchor names.

In step 561, it is determined whether the consumer has input data for the monitoring preferences, e.g., by activating one of the forms or buttons. For example, a message is received from the UE 101 indicating the field and the value to be inserted therein. If so, then in step 563, the user input is inserted into the appropriate fields of the user monitor preferences data structure 460. For example, the text for topics is passed from the DSM module 362 to the CCE module 368 and analyzed for context tokens and semantic tokens and hot words, and those tokens and words are inserted into field 478 of user monitor preference data structure 364. Media types are inserted into field 484, and user specified URLs for resource sections are inserted into field 480. Thus, the module 160 is further configured to receive a monitor message that indicates an item of interest to the consumer, or a particular network resource of interest to the consumer, or a media type of interest to the consumer, or some combination.

In step 565 an updated user record data structure 470 is stored in the user monitor preferences data structure 364, such as a database.

If it is determined in step 561 that there is no user input for the monitor preferences, or after step 565, then it is determined, in step 567, whether there is a context update from the consumer. For example, it is determined if a current context message is received from the context client 109 on UE 101. Thus, the module 160 is further configured to receive a message that comprises data that indicates a context for a particular consumer. If not, then in step 577 it is determined whether conditions to end the process are satisfied. If so, then the process ends. Otherwise, control passes back to step 551 to cause prompts for user input to be presented to the consumer.

After step 565, or if it is determined in step 567 that there is a context update from the consumer, then, in step 571, URL sections associated with the user, e.g., URLs indicated in user specified resource field 480 or discovered resource sections field, are updated. For example, the network resources at these URL are accessed.

In step 573, the URLs to the most relevant sections are pushed to the UE 101. For example, the context token for the consumer's current context is determined. The URL section with the closest match to the context token for the consumer's current context is pushed to the context client 109 or browser 107 in one or more HTTP messages. Thus the module 160 is further configured to determine whether the context for the particular consumer is close to the section context token. The module 160 also causes data identifying the section of the network resource to be transmitted via the network, if it is determined that the context for the particular consumer is close to the section context token. Control passes back to step 567 to determine if another context update is received.

In some embodiments, a match involves also a good match with the other items of interest in the field 478 such as the hot words or the semantic tokens or both. Thus, the service is further configured to transmit via the network data identifying the section of the network resource, if it is determined that the context for the particular consumer is close to the section context token and it is determined that the section is close to an item of interest of the particular consumer.

In some embodiments, a match involves the resource sections specified by the user as indicated in field 480. Thus, the service is further configured to transmit via the network data identifying the section of the network resource, if it is determined that the context for the particular consumer is close to the section context token and it is determined that the network resource is a particular network resource of interest to the particular consumer.

In some embodiments, a match involves the media type specified by the user as indicated in field 484. Thus, the service is further configured to transmit via the network data identifying the section of the network resource, if it is determined that the context for the particular consumer is close to the section context token and it is determined that the resource includes the media type of interest to the particular consumer.

FIG. 6A is a flowchart of a process on consumer equipment for providing context-indexed network resource sections, according to one embodiment. In some embodiments, context client 109 performs the process 600 and is implemented in, for instance, a chip set including a processor and a memory as shown FIG. 8 or a mobile terminal as depicted in FIG. 9.

In step 601, local context on UE 101 is determined. Any method may be used to determine local context. For example, current location of UE 101 is determined based on output from the positioning system module 103. Current time and executing applications on UE 101 are determined by one or more queries to an operating system on UE 101, as is well known in the art. In some embodiments, one or more data sources (such as a social networking service or messaging service) and activities (such as work, home, vacation, dining, shopping) are determined by monitoring messages sent by and received at the UE 101, as is well known in the art. Thus the context client 109 determines local context data that indicates one or more of temporal, spatial, environmental or activity circumstances of a consumer of network services.

In step 603 a user is prompted for user preferences. For example, the UI 108 presents one or more icons on a display screen with active areas to indicate when the user has selected one of the icons. Each icon is associated with some type of user input, such as topics, media types, URLs of resource sections and channels of interest. The channels indicate types of sources or activities of interest to the user at the current time, such as socializing, music listening, video watching, news reading, and trip planning, among others.

Figure 6B:
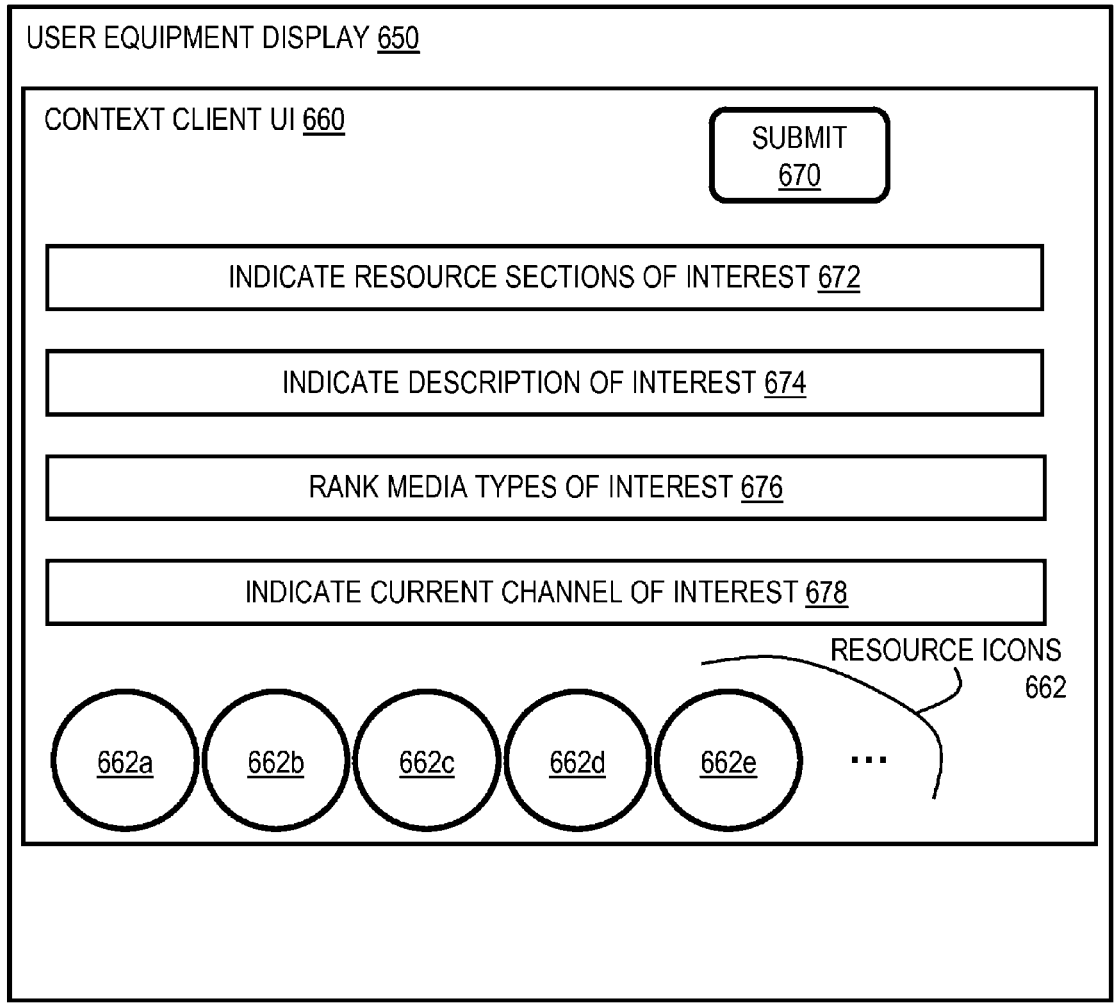
FIG. 6B is a diagram of a user interface utilized in the processes of FIG. 6A, according to one embodiment.
Figure 7:
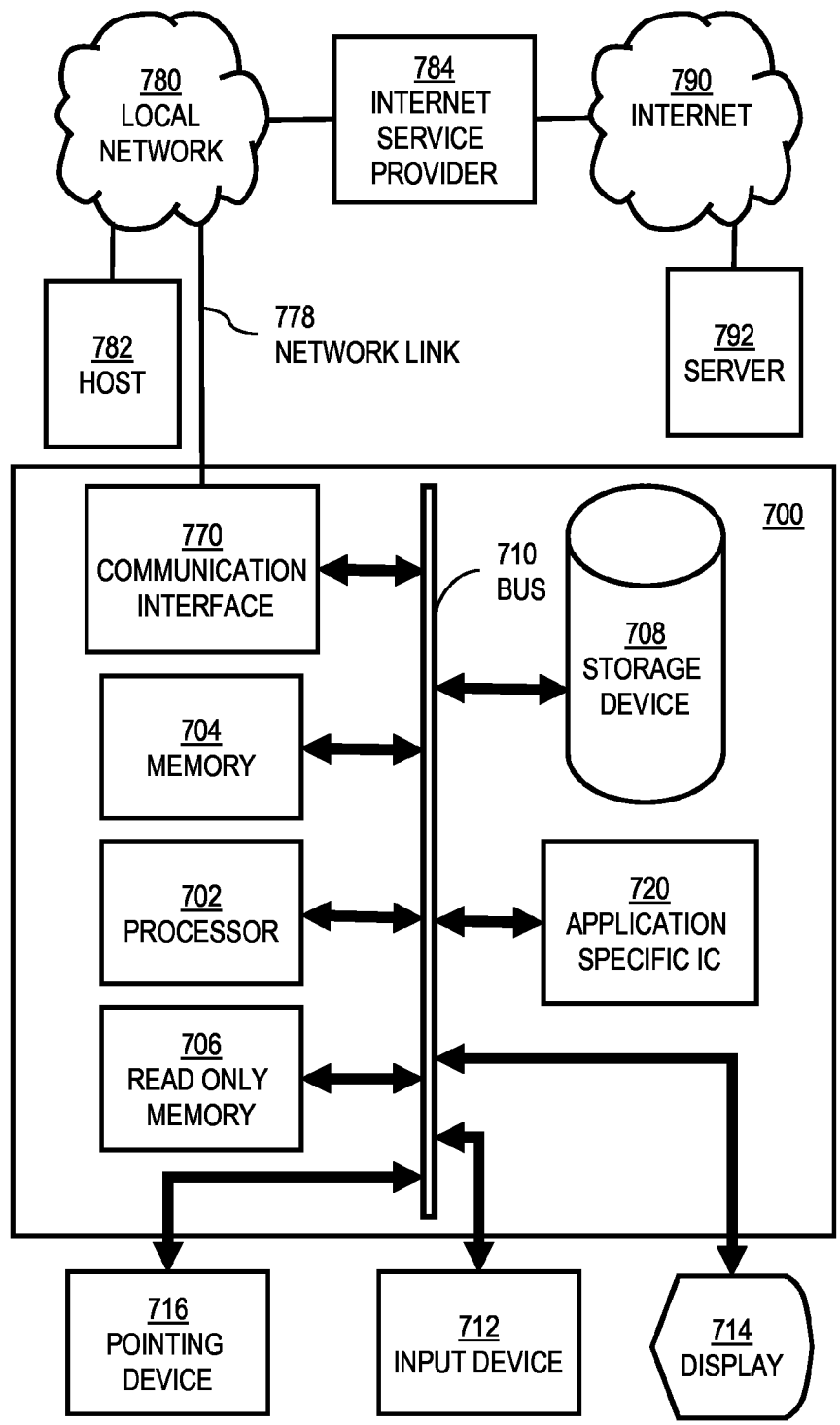
FIG. 7 is a diagram of hardware that can be used to implement an embodiment of the invention.

FIG. 6B is a diagram of a user interface 660 utilized in the processes of FIG. 6A, according to one embodiment. Client context UI interface 660 involves a portion of user equipment display 650. In the illustrated embodiment, the context client UI 660 includes a submit button 670, an area 672 to indicate resource sections of interest, area 674 to indicate a description of interest, an area 676 to rank media types of interest, and an area 678 to indicate current channel of interest. In some embodiments, the context client UI 660 includes zero or more resource icons 662, such as icons 662a, icon 662b, icon 662c, icon 662d, icon 662e and others indicted by ellipsis. Thus, the context client 109 causes, at least in part, actions that result in presenting to a consumer a prompt for a description of an item of interest.

User input into areas 672, 674, 676 and 678 is sent to the context-aware recommendation service 120 by the context client 109 when the submit button is activated, e.g. by touching a touchscreen at the portion of the display occupied by the submit button 670, or using a cursor and pointing device and select key. As a result of the monitor preferences indicated by areas 672, 674, 676 and the current context determined by the context client 109 and consumer input to area 678, one or more network resources are recommended to the consumer and presented as one or more corresponding resource icons 662. Each resource icon is associated with a particular section of a particular network resource that matches closely the current context of the consumer and, in some embodiments, also matches one or more topics or media types of interest, or some combination In step 605, the context of the consumer, and any consumer input for monitor preferences, is sent to the context-aware recommendation service 120, e.g., in one or more messages including XML payloads. The XML payload indicates the context parameters and values that describe the consumer's current context. Thus, the context client causes, at least in part, actions that result in sending the local context data to a service 120 via a network 105. Furthermore, the context client 109 causes, at least in part, actions that result in sending the data indicating the description of the item of interest to the service via the network in response to receiving data indicating the description of the item of interest from the consumer.

In step 607, it is determined whether one or more URLs for a section of a network resource are received from the context-aware recommendation service 120, or a component thereof, such as the DSM module 362. If not, then in step 609, it is determined whether end conditions are satisfied, e.g., powering down the UE 101. If so, then the process ends; otherwise, control passes back to step 601 to update the local context and prompt for further consumer input. Either the context client 109 or the browser 107 may receive the URLs. Thus the context client or browser on the UE 101 determines whether data that indicates a section of a network resource is received in response to sending the local context data.

If it is determined in step 607 that one or more URLs indicating sections of network resources are received from the context-aware recommendation service 120, or a component thereof, then in step 611 the one or more URLs are presented to a user for selection, e.g., as icons 622. In some embodiments, the URLs are presented by the UI module 108 in the same UI used to determine the context channel selected by the consumer. In some embodiments, one or more of the URLs are presented in a web page displayed by a browser 107. Thus, if a URL that indicates a section of the network resource is received, then the client 109 or browser 107 causes, at least in part, actions that result in presenting data that indicates the section of the network resource to the consumer.

In step 613, it is determined whether a consumer has selected a URL, e.g., using a pointing device, such as a touchscreen or cursor and control keys. If not, then control passes to step 609 to determine whether end conditions are satisfied, as described above.

If it is determined, in step 613, that a consumer has selected a URL, then in step 615 the browser requests and displays the section of the web page indicated by the URL. If the browser is not executing when the URL is selected, e.g., the URL is presented by the UI module 108 of the context client 109, then step 615 includes launching the browser 107 and then requesting and displaying the section of the web page based on the URL. Thus, in some embodiments, the context client 109 launches a browser 107 to access the network resource, if it is determined that the consumer has selected the data that indicates the section of the network resource in response to presenting the data that indicates the section to the consumer.

In step 617 the browser is operated based on user input, e.g., the consumer interacts with one or more items or links on the web page provided by the URL. Control then flows to step 609 to determine if end conditions are satisfied, as described above.

An advantage in monitoring sections of web pages for users is a URL pointing to a section of web page can be recommended. For example, for a fan of Team A, who monitors a broadcast company sports pages, the service will not recommend the broadcast company sport page unless Team A is reported on that page. Then the section where the report on Team A is opened in the web browser. Thus is provided a highly advanced model within the overall context framework that monitors specific interest areas within web pages for users and making appropriate recommendations based on those sections.

The processes described herein for providing context-indexed sections of network resources may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide context-indexed sections of network resources as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing context-indexed sections of network resources.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing context-indexed sections of network resources. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing context-indexed sections of network resources. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing context-indexed sections of network resources, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing context-indexed sections of network resources to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
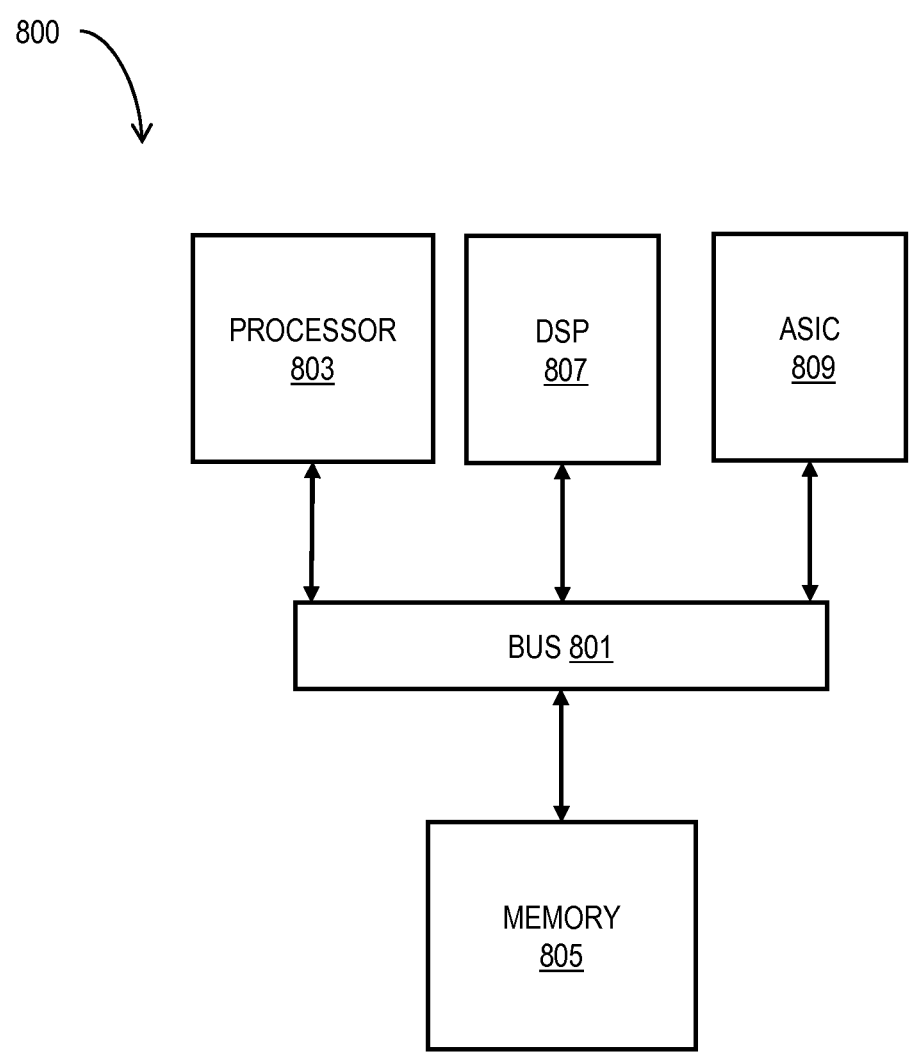
FIG. 8 is a diagram of a chip set that can be used to implement an embodiment of the invention.

FIG. 8 illustrates a chip set or chip 800 upon which an embodiment of the invention may be implemented. Chip set 800 is programmed to provide context-indexed sections of network resources as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of services. Chip set or chip 800, or a portion thereof, constitutes a means for performing one or more steps of providing context-indexed sections of network resources.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide context-indexed sections of network resources. The memory 805 also stores the data associated with or generated by the execution of the inventive steps.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps to provide context-indexed sections of network resources. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing context-indexed sections of network resources. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide context-indexed sections of network resources. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising, in response to receiving first data that describes a network resource,
   determining a section of a plurality of sections included in the network resource;
   determining a section context token that indicates a probability in the section of a topic from a context vocabulary;
   causing, at least in part, actions that result in storing second data that indicates the section in association with the section context token;
   receiving via a network a message that comprises data that indicates a context for a particular consumer;
   determining whether the context for the particular consumer is close to the section context token; and
   determining to transmit via the network data identifying the section of the network resource, if the context for the particular consumer is determined to be close to the section context token and if content of at least one of the section and the network resource is determined to be close to preference of the particular consumer,
   wherein the context vocabulary includes concepts describing temporal, spatial, environmental or activity circumstances of consumers.

2. A method of claim 1, further comprising:
   determining an unusual word different from the context vocabulary in the section; and
   wherein the second data further indicates the unusual word.

3. A method of claim 1, further comprising:
   determining at least one of a category or a script for the section; and
   wherein the second data further indicates the at least one of the category or the script for the section.

4. A method of claim 1, further comprising:
   receiving a monitor message that indicates an item of interest to a consumer; and
   wherein transmitting via the network data identifying the section of the network resource further comprises transmitting via the network data identifying the section of the network resource, if the context for the particular consumer is determined to be close to the section context token and if the section is determined to be close to an item of interest of the particular consumer.

5. A method of claim 1, further comprising:
   receiving a monitor message that indicates a particular network resource of interest to a consumer; and
   wherein transmitting via the network data identifying the section of the network resource further comprises transmitting via the network data identifying the section of the network resource, if the context for the particular consumer is determined to be close to the section context token and if the network resource is determined to be a particular network resource of interest to the particular consumer.

6. A method of claim 1, further comprising:
   receiving a monitor message that indicates a media type of interest to a consumer; and
   wherein transmitting via the network data identifying the section of the network resource further comprises transmitting via the network data identifying the section of the network resource, if the context for the particular consumer is determined to be close to the section context token and if the network resource is determined to include the media type of interest to the particular consumer.

7. A method of claim 1, further comprising:
   processing and/or facilitating a processing of one or more documents describing a plurality of consumer contexts to cause, at least in part, generation or modification of the context vocabulary.

8. A method comprising:
   determining local context data that indicates temporal, spatial, environmental or activity circumstances of a consumer of network services;
   causing, at least in part, actions that result in sending the local context data to a service via a network;

determining whether data that indicates a section of a plurality of sections in a network resource is received in response to sending the local context data;

if the data that indicates the section is received, then causing, at least in part, actions that result in presenting the data that indicates the section to the consumer; and determining to launch a browser to access the section, if the consumer is determined to have selected the data that indicates the section in response to presenting the data that indicates the section to the consumer or if content of at least one of the section and the network resource is determined to be close to preference of the particular consumer, wherein the receipt of the data that indicates the section is: (a) based, at least in part, on a determination of a section context token that indicates a probability in the section of a topic from a context vocabulary, the context vocabulary having concepts describing temporal, spatial, environmental or activity circumstances of one or more consumers, and (b) based, at least in part, on storage of the data that indicates the section in association with the section context token.

9. A method of claim 8, further comprising:

causing, at least in part, actions that result in presenting a prompt for a description of an item of interest; and in response to receiving data indicating the description of the item of interest, sending the data indicating the description of the item of interest to the service via the network.

10. A method of claim 8, further comprising:

processing and/or facilitating a processing of one or more documents describing a plurality of consumer contexts to cause, at least in part, generation or modification of the context vocabulary.

11. An apparatus comprising:

at least one processor; and at least one memory including computer program code, the at least one memory and the computer program code configured to, with the at least one processor, cause the apparatus to perform at least the following, determine a section of a plurality of sections included in a network resource, in response to receiving first data that indicates the network resource;

determine a section context token that indicates a probability in the section of a topic from a context vocabulary;

cause, at least in part, actions that result in storing second data that indicates the section in association with the section context token;

receive a message that comprises data that indicates a context for a particular consumer;

determine whether the context for the particular consumer is close to the section context token; and determine to transmit via the network data identifying the section of the network resource, if the context for the particular consumer is determined to be close to the section context token and if content of at least one of the section and the network resource is determined to be close to preference of the particular consumer, wherein the context vocabulary includes concepts describing temporal, spatial, environmental or activity circumstances of consumers.

12. An apparatus of claim 11, wherein:

the apparatus is further caused, at least in part, to determine an unusual word different from the context vocabulary in the section; and the second data further indicates the unusual word.

13. An apparatus of claim 11, wherein:

the apparatus is further caused, at least in part, to determine at least one of a category or a script for the section; and the second data further indicates the at least one of the category or the script for the section.

14. An apparatus of claim 11, wherein:

the apparatus is further caused, at least in part, to receive a monitor message that indicates an item of interest to a consumer; and transmit data identifying the section of the network resource further comprises to transmit data identifying the section of the network resource, if the context for the particular consumer is determined to be close to the section context token and if the section is determined to be close to an item of interest of the particular consumer.

15. An apparatus of claim 11, wherein:

the apparatus is further caused, at least in part, to receive a monitor message that indicates a particular network resource of interest to a consumer; and transmit data identifying the section of the network resource further comprises to transmit data identifying the section of the network resource, if the context for the particular consumer is determined to be close to the section context token and if the network resource is determined to be a particular network resource of interest to the particular consumer.

16. An apparatus of claim 11, wherein:

the apparatus is further caused, at least in part, to receive a monitor message that indicates a media type of interest to a consumer; and transmit data identifying the section of the network resource further comprises to transmit via the network data identifying the section of the network resource, if the context for the particular consumer is determined to be close to the section context token and if the network resource is determined to include the media type of interest to the particular consumer.

17. An apparatus of claim 11, wherein the apparatus is further caused:

process and/or facilitate a processing of one or more documents describing a plurality of consumer contexts to cause, at least in part, generation or modification of the context vocabulary.

18. An apparatus comprising:

at least one processor; and at least one memory including computer program code, the at least one memory and the computer program code configured to, with the at least one processor, cause the apparatus to perform at least the following:

determine local context data that indicates temporal, spatial, environmental or activity circumstances of a consumer who uses the apparatus;

cause, at least in part, actions that result in sending the local context data to a service via a network;

determine whether data that indicates a section of a plurality of sections in a network resource is received in response to sending the local context data;

if the data that indicates the section is received, then cause, at least in part, actions that result in presenting the data that indicates the section to the consumer; and determine to launch a browser to access the section, if the consumer is determined to have selected the data that indicates the section in response to presenting the data that indicates the section to the consumer or if content of at least one of the section and the network resource is determined to be close to preference of the particular consumer, wherein the receipt of the data that indicates the section is: (a) based, at least in part, on a determination of a section context token that indicates a probability in the section of a topic from a context vocabulary, the context vocabulary having concepts describing temporal, spatial, environmental or activity circumstances of one or more consumers, and (b) based, at least in part, on storage of the data that indicates the section in association with the section context token.

19. An apparatus of claim 18, wherein the apparatus is further caused:
process and/or facilitate a processing of one or more documents describing a plurality of consumer contexts to cause, at least in part, generation or modification of the context vocabulary.

20. An apparatus of claim 18, wherein the apparatus is further caused:
cause, at least in part, actions that result in presenting a prompt for a description of an item of interest; and
in response to receiving data indicating the description of the item of interest, send the data indicating the description of the item of interest to the service via the network.

* * * * *